United States Patent
Parsons (10) Patent No.: US 11,713,692 B2
(45) Date of Patent: Aug. 1, 2023

(54) REAL TIME ENGINE INLET BARRIER FILTER CONDITION MONITOR

(71) Applicant: Textron Innovations Inc., Providence, RI (US)

(72) Inventor: Thomas Dewey Parsons, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 138 days.

(21) Appl. No.: 16/015,599

(22) Filed: Jun. 22, 2018

(65) Prior Publication Data

US 2019/0390564 A1  Dec. 26, 2019

(51) Int. Cl.
| | |
|---|---|
| *F01D 21/00* | (2006.01) |
| *B64D 43/00* | (2006.01) |
| *F02C 7/055* | (2006.01) |
| *G07C 5/00* | (2006.01) |
| *G07C 5/08* | (2006.01) |

(52) U.S. Cl.
CPC ............ *F01D 21/003* (2013.01); *B64D 43/00* (2013.01); *F02C 7/055* (2013.01); *G07C 5/006* (2013.01); *G07C 5/0808* (2013.01); *G07C 5/0825* (2013.01); *F05D 2220/329* (2013.01); *F05D 2250/51* (2013.01); *F05D 2260/80* (2013.01)

(58) Field of Classification Search
CPC ............ B64D 43/00; B64D 2045/0085; B64D 45/00; B64D 2033/022; G07C 5/006; G07C 5/0825; G07C 5/0808; F01D 21/003; F02C 7/055; F02C 7/057; F02C 7/05; F05D 2260/80; F05D 2220/329; F05D 2250/51; F05D 2230/72; Y02T 50/60
USPC ........................................................ 701/32.9
See application file for complete search history.

(56) References Cited

U.S. PATENT DOCUMENTS

| | | | | |
|---|---|---|---|---|
| 5,018,069 A * | 5/1991 | Pettigrew | ................... | F02C 9/00 |
| | | | | 701/31.6 |
| 7,031,812 B1 * | 4/2006 | Pettigrew | ................ | B64C 27/06 |
| | | | | 340/945 |
| 7,491,253 B2 * | 2/2009 | Wilson | .................. | B01D 46/002 |
| | | | | 123/198 E |
| 7,591,173 B2 * | 9/2009 | Benscoter | .......... | B01D 46/0086 |
| | | | | 73/114.33 |
| 8,292,978 B2 * | 10/2012 | Krahl | ................. | B01D 46/0035 |
| | | | | 244/53 B |

(Continued)

OTHER PUBLICATIONS

Kim Breitfelder, Don Messina, IEEE 100 The Authoritative Dictionary of IEEE Standards Terms , IEEE, 7th Edition (Year: 2000).*

(Continued)

*Primary Examiner* — Fadey S. Jabr
*Assistant Examiner* — Mohamed Abdo Algehaim
(74) *Attorney, Agent, or Firm* — Whitaker Chalk Swindle & Schwartz PLLC; Enrique Sanchez, Jr.

(57) ABSTRACT

A differential pressure transducer provides measurements for determining the restriction, updated in real time, of an inlet barrier filter for a turboshaft engine of an aircraft. The percentage of restriction of the air inlet barrier filter, which corresponds to the condition of the air inlet barrier filter, is determined as a function of mass air flow into the engine during operation. The restriction percentage is indicated on the instrument panel of the rotorcraft.

15 Claims, 4 Drawing Sheets

(56) References Cited

U.S. PATENT DOCUMENTS

| | | | |
|---|---|---|---|
| 8,459,038 B1* | 6/2013 | Lickfold | F02K 3/025 60/772 |
| 9,254,921 B2* | 2/2016 | Braeutigam | B64D 33/02 |
| 9,574,497 B2* | 2/2017 | Dailey | F02C 7/04 |
| 2002/0016654 A1* | 2/2002 | Ing | F02C 9/00 701/33.7 |
| 2002/0182062 A1* | 12/2002 | Scimone | B64D 33/02 415/121.2 |
| 2004/0217872 A1* | 11/2004 | Bhardwaj | B01D 46/444 340/607 |
| 2006/0016196 A1* | 1/2006 | Epstein | F02C 9/18 60/773 |
| 2009/0139200 A1* | 6/2009 | Colaprisco | B01D 46/12 60/39.092 |
| 2010/0065139 A1* | 3/2010 | Osswald | F02C 7/052 137/625.44 |
| 2011/0001003 A1* | 1/2011 | Krahl | B01D 46/0035 244/58 |
| 2011/0054811 A1* | 3/2011 | Contini | B01D 35/143 210/90 |
| 2011/0238331 A1* | 9/2011 | Moore | F02D 41/18 702/47 |
| 2013/0092798 A1* | 4/2013 | Boyce | B01D 46/103 244/53 B |
| 2013/0115114 A1* | 5/2013 | Bryant | F02M 35/088 417/279 |
| 2013/0313371 A1* | 11/2013 | Lamb, Jr. | F02C 7/04 244/53 B |
| 2013/0327218 A1* | 12/2013 | Izzi | B01D 46/0082 95/281 |
| 2014/0077039 A1* | 3/2014 | Scimone | B64C 27/28 244/23 B |
| 2015/0096627 A1* | 4/2015 | Dailey | F02C 7/04 137/15.1 |
| 2015/0202561 A1* | 7/2015 | Morgan | B01D 46/522 95/284 |
| 2015/0330310 A1* | 11/2015 | deGaribody | G01S 17/58 701/100 |
| 2016/0055685 A1* | 2/2016 | Lilly | G07C 5/0808 701/1 |
| 2016/0208716 A1* | 7/2016 | Bewick | F02C 6/08 |
| 2016/0342930 A1* | 11/2016 | Tucker | G06Q 10/20 |
| 2016/0342956 A1* | 11/2016 | Tucker | G06Q 10/20 |
| 2017/0067814 A1* | 3/2017 | Steinert | B64C 27/14 |
| 2017/0211498 A1* | 7/2017 | Moore | F02M 35/1038 |
| 2017/0259936 A1* | 9/2017 | Schaupmann | G01M 3/26 |
| 2017/0284927 A1* | 10/2017 | Hamann | G01N 33/0004 |
| 2017/0287235 A1* | 10/2017 | Ozturk | G07C 5/02 |
| 2017/0306788 A1* | 10/2017 | Vega | G01M 15/14 |
| 2018/0073386 A1* | 3/2018 | Zhang | B01D 46/448 |
| 2018/0202398 A1* | 7/2018 | Jammoussi | F02M 35/104 |
| 2018/0238235 A1* | 8/2018 | Dailey | F02C 3/30 |
| 2018/0297718 A1* | 10/2018 | Adibhatla | G07C 5/006 |
| 2018/0305035 A1* | 10/2018 | Bergami | F02C 7/055 |
| 2018/0312270 A1* | 11/2018 | Boyce | B64D 33/02 |
| 2018/0350165 A1* | 12/2018 | Moravek | G07C 5/085 |
| 2019/0112075 A1* | 4/2019 | Kalmar | B64F 5/60 |
| 2019/0146000 A1* | 5/2019 | Hurst | G01P 5/14 |
| 2019/0224607 A1* | 7/2019 | Bergami | B01D 46/0086 |
| 2019/0309689 A1* | 10/2019 | Meisner | F02C 9/56 |
| 2019/0339688 A1* | 11/2019 | Celia | G06K 9/6263 |
| 2019/0359240 A1* | 11/2019 | Domingos | B61L 27/0094 |
| 2021/0147097 A1* | 5/2021 | Bigeard | F02M 35/082 |
| 2022/0260031 A1* | 8/2022 | Li | F02M 35/024 |

OTHER PUBLICATIONS

Microsoft Computer Dictionary Fifth Edition 2002 Microsoft Press p. 527 (Year: 2002).*

* cited by examiner

REAL TIME ENGINE INLET BARRIER FILTER CONDITION MONITOR

BACKGROUND OF THE INVENTION

1. Field the Invention

The present invention relates generally to engine inlet air filters and more particularly to monitoring air flow through inlet barrier filters for turboshaft engines such as used in rotorcraft vehicles to determine when maintenance of the filter is required.

2. Background of the Invention

Turboshaft engines are widely used as power plants in all types of vehicles including aircraft, land based vehicles and ships and boats. Such engines may also be used in auxiliary power units and other stationary equipment. One particular aircraft application is to provide power systems for rotorcraft. Turboshaft engines compress inlet air in a compressor, which is then mixed with fuel and ignited to drive a compressor turbine. The heated, expanding air-fuel mixture drives an aerodynamically-coupled "power" turbine that is connected to an output shaft called a power shaft that may be connected through a transmission apparatus to the driven element of a drive train or a propeller. It is a characteristic of turboshaft engines that the power turbine is not mechanically connected to the inlet compressor or compressor turbine. This design allows the compressor and compressor turbine (often called the gas generator) to rotate at different speeds than the power turbine. It also can eliminate the need for transmissions and clutches in some applications, thereby simplifying the drive train of a vehicle.

To prevent damage to the engine, an expensive assembly of substantial precision in its construction, the inlet air admitted to the engine is often filtered to ensure the inlet air is free of debris that could be harmful to the engine. However, as the filter performs its function, to remove debris from the inlet air stream, the filter becomes clogged, which increases the pressure drop across the filter. The increase in pressure drop decreases the available shaft power and increases fuel consumption. In the case of a rotocraft powered by a turboshaft engine, the pressure drop due to filter contamination can cause a reduction in available shaft power—and engine performance—below its rated value as published in the applicable aircraft flight manual, as in "flight manual performance can no longer be achieved.

In a typical example of a prior art rotorcraft, the condition of the engine air inlet barrier filter is subject to inspection based on a message or data displayed by a crew alerting system (CAS) located in the cockpit of the rotorcraft. The CAS may display a message or indicator that maintenance of the inlet barrier filter may be required based on the output of a transducer positioned in the air flow inlet to the engine. The transducer may be a switch that changes state in response to the output of a differential pressure (or, pressure drop, dP) sensor.

While the change of state of the switch can indicate a threshold that may correspond to the need to clean or replace a filter element, the setting of the threshold may be a compromise that is not well-suited to actual operating conditions of the rotorcraft in a given application. For example, setting the threshold at higher levels of differential pressure dP that are equivalent to higher airflows associated with maximum take-off power may not indicate a need for filter maintenance as soon as it is needed based on the actual continuous uses of the rotorcraft. On the other hand, with a fixed threshold responsive to a single change of state of the transducer switch, the CAS may indicate a premature need to service the inlet filter if the threshold is set at too low a level. What is needed is a system for indicating the need for inlet barrier filter maintenance that more closely corresponds with continuous use rather than one example of a peak load use.

SUMMARY OF THE INVENTION

In one embodiment an aircraft equipped with a flight control computer system responsive to programmed instructions and powered by at turboshaft engine, an engine inlet barrier filter monitor comprises a differential pressure transducer for measuring differential pressure dPx across the inlet filter during operation of the aircraft to continuously produce an output value in real time; a digitizing mechanism in the flight control system to convert the output value to digital form for storage in a register; a processing algorithm executed in the flight control computer system for calculating a percent restriction of air flow through the inlet filter from the digitized and stored output value as a function of a predicted mass air flow value W1 through the turboshaft engine; and a display interface for converting the percent restriction of air flow to a displayed indication of inlet filter condition (or "health").

In one aspect, the display interface may comprise a visual indicator driven by a graphics processor and configured to output a percent restriction reading accompanied by a statement "maintenance required" when the indicated percent restriction exceeds a predetermined value.

In another embodiment a method is provided for monitoring restriction in an air inlet filter of a turboshaft engine in an aircraft having a flight control computer system operable according to programmed instructions stored in non-volatile memory, the method comprising the steps of constructing a graphical characteristic curve set of a functional relationship of differential pressure dP as a function of a mass inlet air flow W1 for the turboshaft engine as installed in the aircraft; receiving a real time transducer value dPx from a differential pressure transducer disposed in an inlet air path of the turboshaft engine corresponding to pressure drop across the inlet filter; retrieving operating parameters of the engine stored in the non-volatile memory, the operating parameters including aircraft speed, compressor and power shaft speeds, and ambient pressure and temperature referenced to sea level standard values, which together comprise independent variables for predicting the mass inlet air flow W1 for the turboshaft engine; calculating the mass inlet air flow value W1 from the operating parameters; calculating a percentage restriction of the air inlet filter; and outputting an air inlet filter state to an instrument panel indication corresponding to the percentage restriction.

In one aspect, the graphical characteristic curve set comprises a first curve representing a characteristic for a clean inlet air filter versus the mass air inlet flow (W1) and a second curve representing a characteristic for a maximum allowable restriction of the inlet air filter versus W1.

In another aspect, the step of calculating the percentage restriction comprises the steps of: entering a graphical plot of filter restriction characteristics along an independent variable corresponding to the calculated mass inlet air flow value W1 at a time t1 retrieved from the random access memory; selecting values for dPclean and dPmax where the mass inlet air flow value W1 crosses the filter restriction characteristics; applying an algorithm to the selected values for dPclean and dPmax and the received real time transducer value dPx to determine the percentage restriction at the time t1; and storing the resulting percentage restriction in a register of the flight control computer.

In another aspect, the algorithm comprises a function expressed as R=(dPx−dPclean)/(dPmax−dPclean)×100 where R is the percentage restriction evaluated at a current value W1 of mass air flow at the inlet to the engine at the time t1, dPclean=value of dP for a clean filter at W1, dPmax=value of dP for a clogged filter at W1, and dPx=transducer value of dP at W1; and the current value W1 is determined by the engine thermodynamic model according to values for airspeed, ambient temperature and pressure, and the shaft speeds of a gas generator portion and a power turbine of the engine.

DETAILED DESCRIPTION OF THE INVENTION

Accordingly, in an advance in the state of the art, the present invention provides a continuous, real-time air inlet barrier filter "health" or condition monitor system and method that operates irrespective of mass air flow into the engine or the power setting of the engine and indicates the percentage amount of restriction of the filter as it becomes clogged during use. An indicator gives the pilot advance warning that the inlet barrier filter is clogged. Instead of merely generating an alarm or message under a single, predetermined condition, the invention is responsive to actual operating conditions because it is based on the relationship that differential pressure dP increases as a function of mass air flow (squared) into the engine. That is, the "health" or condition monitor is sensitive to the component variables of the mass air flow inlet to the engine, which in turn are affected by the varying levels of filter restriction. Thus the filter monitor is responsive to and reflects the effects of atmospheric variables such as temperature and pressure, the airspeed of the rotorcraft, the speeds of the compressor and power turbine shafts, and any impediment offered by restriction of the filter itself.

The following detailed description of the illustrated embodiment depicted in the drawings uses reference numbers to refer to various components of the apparatus, steps of the methods, or aspects of the relationships or parameters involved in describing the invention. Reference numbers that appear in more than one drawing figure refer to the same element, step or aspect. In some cases the units of certain parameters, as used in the aircraft industry, may be denoted by abbreviations such as lbm/sec, which means "pounds mass per second," a unit for air flow through a defined area, where the lower case m denotes mass (not meters). In another example, the term "dP" stands for "differential pressure" and is expressed herein in pounds-per-square-inch (PSI).

The illustrated embodiment describes the invention as it may be used with a rotorcraft powered by a turboshaft engine. The description illustrates the concepts implemented in the invention but should not be considered as limiting of the scope of the invention. For example, the concept described herein for inlet barrier filters for a turboshaft engine as used in rotorcraft has wide applicability to engines that operate on air and fuel mixtures, wherein the air intake limits the air inlet to the engine to air that has been filtered by a filter element placed in the air inlet path.

For example, the present invention is well-suited for engines that rely on compressed or forced induction of air into the engine air intake where the pressure drop across the inlet filter can impede the performance of the engine. Moreover, vehicles powered by such means that are typically operated under the control of digital or computer systems operable according to programmed instructions implemented in software, for example, and which may include instrument panel apparatus for the display of operational characteristics and data, are well-adapted to the uses of the concepts described herein.

Figure 1:
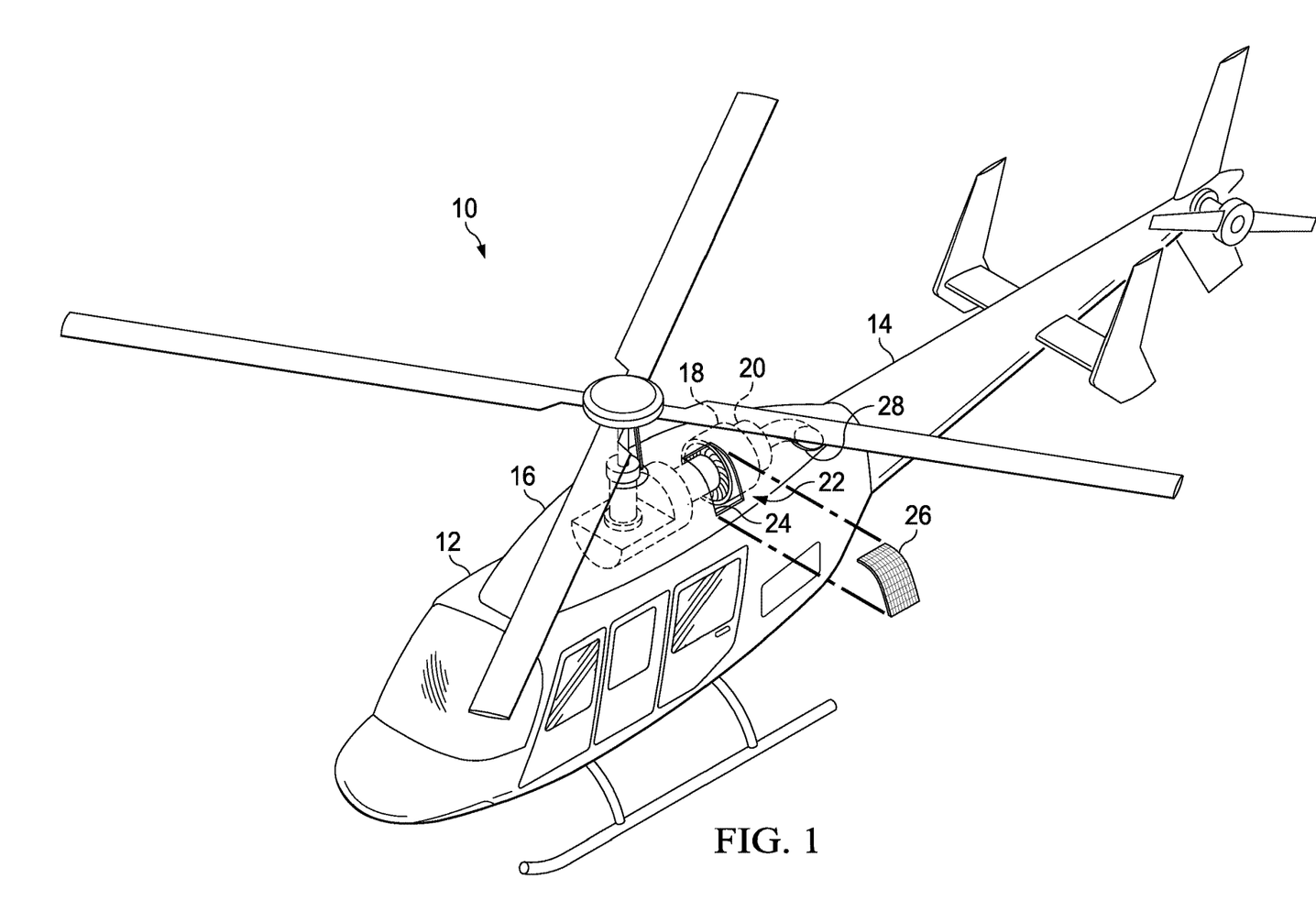
FIG. 1 is a pictorial illustration of a rotorcraft equipped with a turboshaft engine and an inlet barrier filter according to an embodiment of the claimed invention.

FIG. 1 is a simplified pictorial illustration 10 of a rotorcraft 12 equipped with a turboshaft engine 18, 20 (shown partially in phantom) and an inlet barrier filter 26 according to an embodiment of the claimed invention. The turboshaft engine includes a gas generator section 18 and a power turbine section 20. The power turbine section may be coupled through a power transmission section to a rotor drive typically located in the upper portion of the rotorcraft 12 under a cowling 16 and behind the cockpit. The air inlet barrier filter 26 may be located in an opening 24 along the side of the engine in the path of the air inlet 22 to the gas generator section 18 of the turboshaft engine. In other embodiments the air inlet barrier filter 26 may not be limited to a side-facing inlet. The air inlet filter 26 may be an assembly that may consist of a replaceable filter element and a supporting frame for installation in an opening in the fuselage 14 of the rotorcraft 12.

Figure 2:
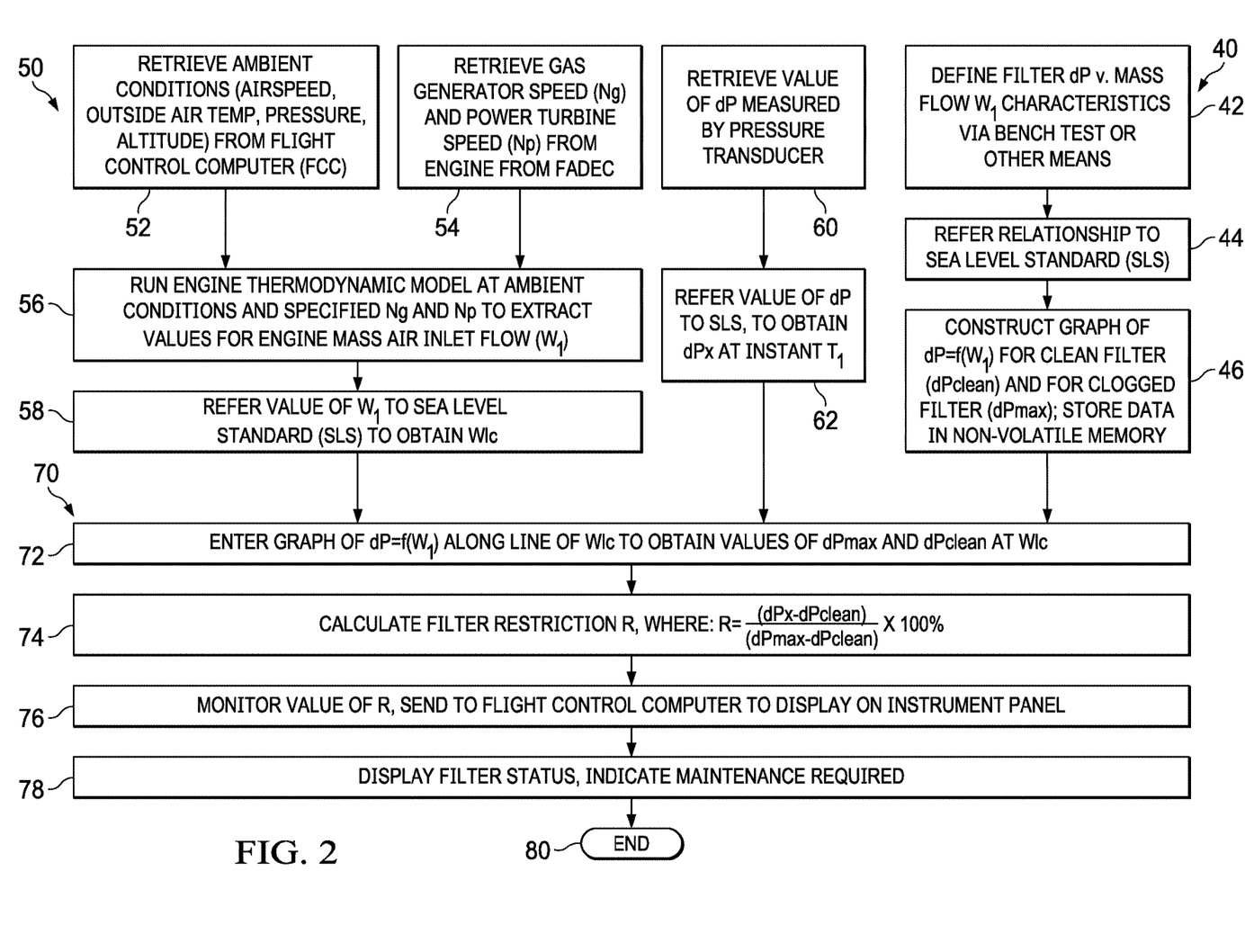
FIG. 2 is an illustration of a process flow diagram according to the embodiment of the claimed invention depicted in FIG. 1.

FIG. 2 is an illustration of a process flow diagram of a method according to the embodiment of the claimed invention depicted in FIG. 1. The diagram is arranged in three components or sections. In the first section 40 at the upper right-hand corner are process steps 42 and 44 for defining filter restriction characteristics, in terms of differential pressure ("dP") or pressure drop as a function of the mass air flow ("W1") of air inlet to a turboshaft engine. The values of dP and W1 are corrected to sea level standard ("SLS") ambient values, to obtain respectively dPc and W1$c$ as will be described.

The first section 40 also includes a step 46 describing construction of a graphical plot 90 (see FIG. 3) of first and second characteristic curves for dP (in PSI, pounds per square inch) versus W1 (in lbm/sec, pounds mass per second) for both a clean filter (lower or first curve, dPclean 92) and a filter having the maximum allowable restriction (upper or second curve, dPmax 94). Maximum allowable restriction means that the inlet air filter 26 is 100% restricted and requires maintenance (cleaning or replacement, for example) before further operation of the rotorcraft 12. The characteristic curves for each condition are exponential, because the differential pressure dPc increases as the square of mass air flow W1$c$. These first and second curves are used to obtain threshold values for dPclean and dPmax at a given instant value of W1$c$ taken at a time t1, so that the percentage restriction R of the filter can be calculated at that time t1 and used to develop an indication of the condition or "health" of the inlet barrier air filter 26. In the graph 90, the region between the first 92 and second 94 curves corresponds to an operating range—the allowable amount of restriction of the inlet barrier filter 26 for operating the rotorcraft 12. The use of these characteristic curves 92, 94 will be described herein below.

In a second section 50 of the flow diagram at the left side of FIG. 2 is a sequence of process steps 52 through 62 for determining the parameter values to be used for selecting the values of dPc in calculating the percentage restriction R of the filter 26 at the instant in time the value of W1c is determined. The two parameters are W1c and dPx. W1c is a function of ambient conditions, engine gas generator 18 and power turbine 20 speeds, as applied to an engine thermodynamic model for the particular engine used in the rotorcraft 12. Ambient conditions include airspeed in knots of the rotorcraft 12 and ambient temperature (degrees Kelvin) and pressure altitude, in feet, determined from atmospheric pressure (lb/in squared or PSIamb) obtained from a flight control computer (not shown) in the rotorcraft 12. The speed of the engine gas generator 18=compressor shaft speed (Ng, RPM or %) and the speed of the power turbine 20=engine output shaft speed (Np, RPM or %) are obtained from the "fill authority digital engine control" or "FADEC." The FADEC is a unit which contains the software for controlling the engine 18, 20 in the rotorcraft 12. The differential pressure, also called the pressure drop parameter dPx,=the differential pressure reading obtained from a pressure transducer 30 located in the air inlet 24 of the turboshaft engine 18, 20 on the rotorcraft 12 as shown in FIG. 1. As will be explained, the values of W1 and dPx are corrected to W1c and dPc respectively before they are referred to the graph 90 of the second section of the flow diagram of FIG. 2.

Figure 3:
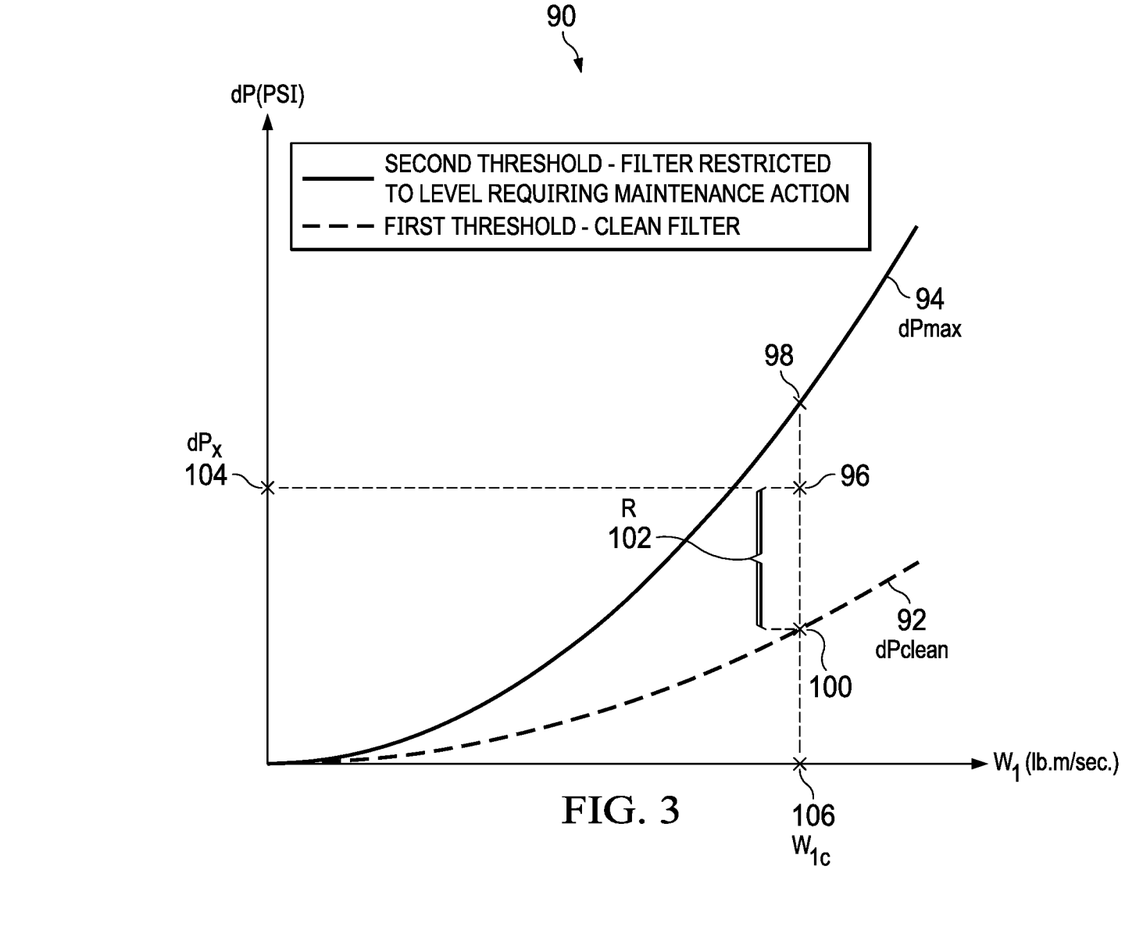
FIG. 3 is a graphical representation relating differential pressure to mass inlet air flow through an inlet barrier filter as used in the embodiment of FIGS. 1 and 2.

The third section 70 of FIG. 2 contains a sequence of the process steps 72 through 78 to calculate the current amount of restriction R of the inlet barrier filter 26 at the moment the measurement of dP and the calculation of W1 are obtained from the pressure transducer 30 and the flight control computer of the rotorcraft. The amount of restriction R in percent is calculated using the formula:

$$R = (dPx - dPclean)/(dPmax - dPclean) \times 100 \text{ in percent (\%)}$$

where dPx is the value of dP output from the pressure transducer 30, corrected for SLS (sea level standard values). The values of dPmax, and dPclean are read from the two characteristic curves, respectively dPmax 94 (second curve) and dPclean 92 (first curve), where they are intersected by a vertical line extending upward from the value 106 of W1c provided by the process depicted in the second section of the flow diagram of FIG. 3. In the last step of section three, a maintenance needed indication is provided to a display 130 on the cockpit instrument panel 110 to alert the pilot that the inlet barrier filter 26 needs to be cleaned or replaced. The threshold corresponding to the percentage value R determined from the calculation described above may in some applications be adjusted so that the indication is presented at some percentage value less than 100% to provide some margin to allow the rotorcraft 12 to proceed to its destination to receive the required maintenance.

The process steps of sections 40, 50 and 70 of the flow diagram in FIG. 2, which may be performed in the flight control computer of the rotorcraft 12, begin with steps 52 and 54. In step 52, data for ambient conditions (airspeed in knots, outside air temperature in degrees Centigrade converted to degrees Kelvin, and pressure altitude in feet) are retrieved from registers by the flight control computer and input to step 56. In step 54, data for gas generator speed (Ng) and power turbine speed (Np) are retrieved from the FADEC and input to step 56. The software in the flight control computer then runs an engine thermodynamic model at the measured ambient conditions from steps 52 and 54 to extract values for the engine mass air inlet flow W1. In the following step 58 the value of W1 is corrected to sea level standard (SLS) to yield the corrected value W1c. In step 62, the measured value of dP is received from the pressure transducer 30 (see FIG. 4) and referred to SLS to obtain the value of dPx at the same instant t1 corresponding to the corrected value W1c.

Continuing with FIG. 2, the values of dPmax and dPclean are read in process step 72 from the intersection of dPx and W1c with the characteristic curves 92, 94 to enable calculation of the value of R using the instant values of dPx, dPmax, and dPclean in step 74 at the instant t1. As shown in FIG. 3, the value of R (denoted by reference number 102) is proportional to the quotient of the distance between reference numbers 96 and 100 and (divided by) the distance between reference numbers 98 and 100. In step 76 the value of R is monitored and forwarded to a display to interface (not shown) in the flight control computer for display in step 78 on an indicator 130 on the instrument panel 110 inside the rotorcraft 12. The indicator 130 may display the percentage value of R as calculated and may also display a message such as maintenance required.

FIG. 3 is a graphical representation 90 relating differential pressure dP to mass inlet air flow W1 through an inlet barrier filter 26 as used in the embodiment of FIGS. 1 and 2. The characteristic curves 92 and 94 respectively represent the exponential functions of the relationships of dPclean and dPmax with respect to the mass air inlet flow W1 over a range of values of W1 as the rotorcraft 12 is operated. The differential pressure dPx is measured by the pressure transducer 30 (see FIG. 4) and the value of W1c is calculated as described in the process depicted in FIG. 2. In the process described, these variables are determined at each instant of time t1 during operation of the aircraft, thereby providing a real time indicator to the pilot of the status of the inlet barrier filter 26. The characteristic curves 92, 94 shown on the graphical representation 90 of FIG. 3 depict the relationships of the independent and dependent variables involved in the processes, well understood by persons skilled in the art, that are carried out in the flight control computer on board the aircraft and operating according to programmed instructions.

Figure 4:
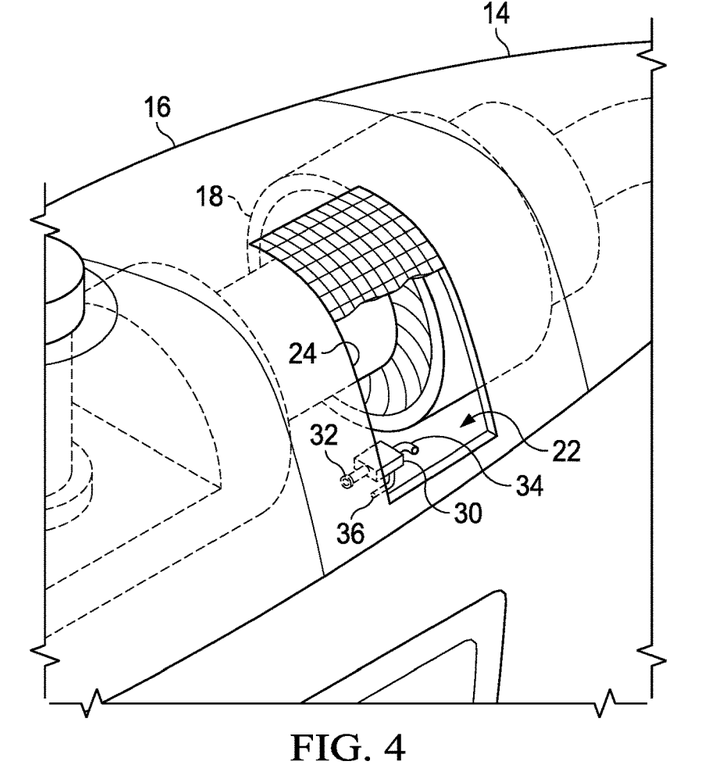
FIG. 4 is an enlarged pictorial view of a portion of FIG. 1.

FIG. 4 is an enlarged pictorial view of a portion of FIG. 1 showing the air inlet opening 24 in the cowling 16 of the fuselage 14 that covers the turboshaft engine 18, 20 of the rotorcraft 12. The opening includes the air inlet 22 leading to the inlet side of the gas generator 18 portion of the turboshaft engine 18, 20. Just inside the opening 24 adjacent the position of the air inlet barrier filter 26 (not shown in this view—see FIG. 1) is a simplified depiction of the differential pressure transducer 30. The transducer includes at least two sensing inputs, a first one 32 to sense the ambient pressure outside the rotorcraft near where air enters the filter 26, and a second one 34 to sense the air pressure proximate the outlet side of the filter 26 inside the cowling 16. The measurements preferably occur simultaneously at a given time t1 to provide the difference in air pressure at the two locations—the differential pressure dPx. An electrical signal representing the differential pressure dPx may be conducted along a wiring harness 36 to the flight control computer in the rotorcraft 12.

Figure 5:
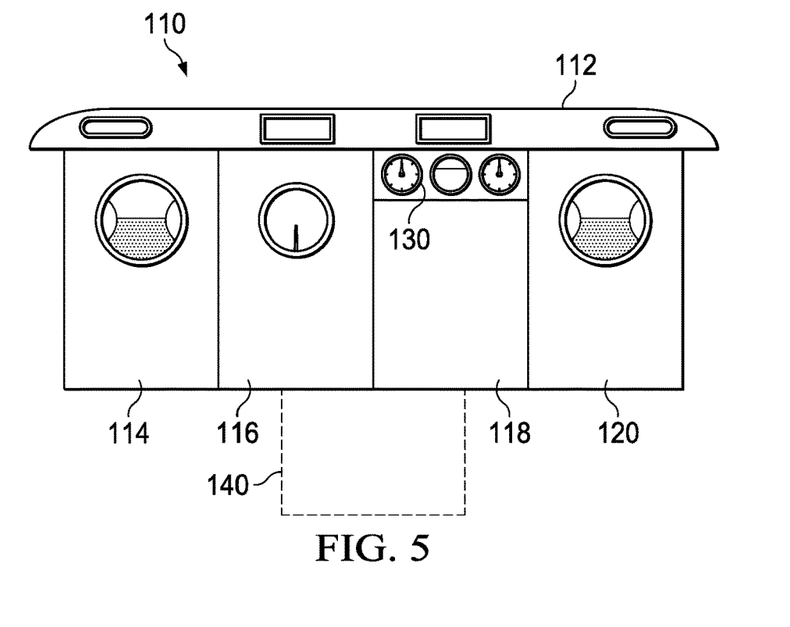
FIG. 5 illustrates an instrument panel for use in the rotorcraft depicted in FIG. 1.

FIG. 5 is an illustration of an instrument panel that may be used in the rotorcraft 12 depicted in FIG. 1. Shown extending across the upper portion of the panel 110 is a narrow panel section 112 that may or may not be organized as a single section or a split, dual section for convenient observation and use by a pilot and copilot. In a typical rotorcraft 12 the panel 110 may further include separate but similar sections 114 and 120 containing similar instruments, again for use by pilot and copilot. Additional sections 116 and 118 may be located in this example between the outer sections 114 and 120. The indicator 130 may be positioned on the panel as depicted in FIG. 5 at the location in the upper portion of the section 118. The indicator 130, which may be calibrated in a scale from zero to 100% and, for example, take the form of a round gauge as shown or a bar graph indicator, may be provided to display the inlet barrier filter percentage restriction R. Alternatively, the indicator 130 may be positioned elsewhere according the particular cockpit design. In a typical instrument panel configuration, the panel 110 may be positioned just above a pedestal 140 represented by the dashed line that includes other operating controls and indicators of the aircraft.

The foregoing detailed description is shown and described in only one of its forms—with a turboshaft engine for powering a rotorcraft for example—to illustrate the concept of the invention. Persons skilled in the art will understand that this concept is susceptible of various changes and modifications and may be implemented or adapted readily to other types of engines that require air mixed with fuel for operation and provide for filtering the air conducted into the engine. Further, the invention is not limited to use with turboshaft engines or to engines used in rotorcraft. Other types of internal combustion engines and other types of motorized vehicles are suitable candidates for the use of this invention, including engines that operate on compressed air or forced air induction.

What is claimed is:

1. In an aircraft equipped with a flight control computer system responsive to programmed instructions and powered by a turboshaft engine, an engine inlet barrier filter monitor, comprising:
    a differential pressure transducer for measuring differential pressure dPx across the inlet barrier filter during operation of the aircraft to continuously produce an output value in real time;
    a digitizing mechanism in the flight control computer system to convert the output value to digital form for storage in a register;
    a processing algorithm executed in the flight control computer system for calculating a percent restriction of air flow through the inlet barrier filter from the digitized and continuous real time output value as a function of a predicted mass air flow value W1 of air inlet to the turboshaft engine based on a maximum allowable restriction, wherein W1 is calculated using an engine thermodynamic model; and
    a display interface for converting the percent restriction of air flow to a real time displayed indication of the inlet barrier filter condition, wherein the displayed indication is continuously displayed in real time on the display interface.

2. The filter monitor of claim 1, wherein the predicted mass inlet air flow value W1 comprises:
    an operating condition calculated in the flight control computer system derived from the engine thermodynamic model for the turboshaft engine and given operating parameters including at least aircraft speed, compressor and power shaft speeds, and ambient pressure and temperature corrected to sea level standard values.

3. The filter monitor of claim 1 wherein the digitizing mechanism comprises: an analog-to-digital converter.

4. The filter monitor of claim 1, wherein the processing comprises:
    a function expressed as $R=(dPx-dPclean)/(dPmax-dPclean) \times 100$ where R is evaluated at a current value W1 of real time mass air flow at the air inlet to the turboshaft engine, dPc=value of dP for a clean filter at W1, dPmax=value of dP for a clogged filter at W1, and dPx=transducer value of dP at W1.

5. The filter monitor of claim 1, wherein the display interface comprises:
    a visual indicator driven by a graphics processor and configured to output a percent restriction reading accompanied by a statement "maintenance required" when the indicated percent restriction exceeds a predetermined value.

6. The filter monitor of claim 5, wherein the predetermined value comprises less than 100 percent.

7. The filter monitor of claim 5, wherein the percent restriction reading comprises:
    a gauge display of continuous real time values between 0 and 100 percent.

8. The system of claim 1, wherein dPx is corrected for sea level standard values.

9. A method for monitoring restriction in an air inlet filter of a turboshaft engine in an aircraft having a flight control computer system operable according to programmed instructions stored in non-volatile memory, comprising the steps of:
    constructing a graphical characteristic curve set of a functional relationship of differential pressure dP as a function of a mass inlet air flow W1 at the air inlet to the turboshaft engine as installed in the aircraft;
    receiving a real time transducer value dPx during operation of the aircraft from a differential pressure transducer disposed in an inlet air path of the turboshaft engine corresponding to pressure drop across the air inlet filter;
    retrieving operating parameters of the turboshaft engine according to its thermodynamic model stored in the non-volatile memory, the operating parameters including aircraft speed, compressor and power shaft speeds, and ambient pressure and temperature referenced to sea level standard values, which together comprise independent variables for predicting the mass inlet air flow W1 at the air inlet to the turboshaft engine;
    calculating for the turboshaft engine, using an engine thermodynamic model, the predicted mass inlet air flow value W1 from the operating parameters;
    calculating a percentage restriction of the air inlet filter based on a maximum allowable restriction; and
    outputting in real time an air inlet filter condition to an instrument panel indication corresponding to the percentage restriction, wherein the air inlet filter condition is continuously displayed.

10. The method of claim 9, wherein the graphical characteristic curve set comprises:
   a first curve representing a characteristic for a clean air inlet filter, dPclean versus W1, and a second curve a characteristic for a maximum allowable restriction of the air inlet filter, dPmax versus W1.

11. The method of claim 9, wherein the step of receiving comprises the step of:
   digitizing the real time transducer value dPx and storing the digitized value dPx in a random access memory.

12. The method of claim 9, wherein the step of calculating the percentage restriction comprises the steps of:
   entering a graphical plot of filter restriction characteristics along an independent variable corresponding to the calculated mass inlet air flow value W1 at a time t1 retrieved from the random access memory;
   selecting values for dPclean and dPmax where the mass inlet air flow value W1 crosses the filter restriction characteristics;
   applying an algorithm to the selected values for dPclean and dPmax and the received real time transducer value dPx to determine the percentage restriction at the time t1; and
   storing the resulting percentage restriction in a register of the flight control computer system.

13. The method of claim 12, further comprising the step of:
   retrieving the stored percentage restriction and displaying it to a pilot of the aircraft.

14. The method of claim 12, wherein the algorithm comprises:
   a function expressed as R=(dPx−dPclean)/(dPmax−dPclean)×100 where R is the percentage restriction evaluated at a current value W1 of evaluated at a current value W1 of real time mass air flow at the air inlet to the engine at the time t1, dPclean=value of dP for a clean filter at W1, dPmax=value of dP for a clogged filter at W1, dPx=transducer value of dP at W1; and
   the current value W1 is determined by the engine thermodynamic model according to values for aircraft speed, ambient temperature and pressure, and the compressor and power shaft speeds of a gas generator portion and a power turbine of the turboshaft engine.

15. The method of claim 9, wherein dPx is corrected for sea level standard values.

* * * * *